US012732738B2

(12) United States Patent
Chang et al.

(10) Patent No.: US 12,732,738 B2
(45) Date of Patent: Sep. 8, 2026

(54) DETACHABLE HEADPHONE MODULE AND AUGMENTED REALITY GLASSES THEREWITH

(71) Applicant: Acer Incorporated, New Taipei City (TW)

(72) Inventors: Jia-Ren Chang, New Taipei City (TW); Feng-Ming Liu, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 117 days.

(21) Appl. No.: 18/805,773

(22) Filed: Aug. 15, 2024

(65) Prior Publication Data

US 2025/0330741 A1 Oct. 23, 2025

(30) Foreign Application Priority Data

Apr. 17, 2024 (TW) ................................ 113114217

(51) Int. Cl.
*H04R 1/10* (2026.01)
*H04R 1/02* (2006.01)
*H04R 1/28* (2006.01)

(52) U.S. Cl.
CPC ........... *H04R 1/1066* (2013.01); *H04R 1/028* (2013.01); *H04R 1/1008* (2013.01);
(Continued)

(58) Field of Classification Search
CPC .... H04R 1/1066; H04R 1/028; H04R 1/1008; H04R 1/2811; H04R 1/2896; H04R 2499/15
See application file for complete search history.

(56) References Cited

U.S. PATENT DOCUMENTS 2,930,858 A * 3/1960 Hollingsworth ....... G02C 11/06 381/381
3,368,644 A * 2/1968 Henderson ............ G02C 11/06 381/328

(Continued)

FOREIGN PATENT DOCUMENTS

CN 215340587 U 12/2021
CN 217789870 U 11/2022

(Continued)

OTHER PUBLICATIONS

Machine translation of JP3199563 (Year: 2015).*
Chinese language office action dated May 23, 2025, issued in application No. TW 113114217.

*Primary Examiner* — Andrew Sniezek
(74) *Attorney, Agent, or Firm* — McClure, Qualey & Rodack, LLP

(57) ABSTRACT

A detachable headphone module includes an engaging member and a sound output assembly. The engaging member is configured to engage with a temple of augmented reality glasses, and the engaging member has a sound input channel which is aligned with a first sound output opening of the temple. The sound output assembly is configured to be connected to the engaging member and has a communication channel, a front chamber and a second sound output opening. The communication channel is communicated with the sound input channel. The front chamber is communicated with the communication channel. The second sound output opening is configured to communicate with the front chamber. The sound output assembly extends from the engaging member in a first direction, the temple extends in a second direction, and the included angle formed between the first direction and the second direction is between 0 and 90 degrees.

19 Claims, 11 Drawing Sheets

(52) U.S. Cl.
CPC ......... *H04R 1/2811* (2013.01); *H04R 1/2896* (2013.01); *H04R 2499/15* (2013.01)

(56) References Cited

U.S. PATENT DOCUMENTS

| | | | | |
|---|---|---|---|---|
| 3,604,861 A * | 9/1971 | Lewis | G02C 11/06 381/381 |
| 9,380,374 B2 * | 6/2016 | Sprague | H04R 25/65 |
| 9,621,976 B2 | 4/2017 | Han | |
| 10,860,100 B2 * | 12/2020 | Osterhout | G06F 3/0346 |

FOREIGN PATENT DOCUMENTS

| | | |
|---|---|---|
| JP | 3199563 U * | 9/2015 |
| TW | M532126 U | 11/2016 |

* cited by examiner

100C

DETACHABLE HEADPHONE MODULE AND AUGMENTED REALITY GLASSES THEREWITH

CROSS REFERENCE TO RELATED APPLICATIONS

This application claims the benefit of Taiwan Patent Application No. 113114217, filed on Apr. 17, 2024, the entirety of which is incorporated by reference herein.

BACKGROUND OF THE INVENTION

Field of the Disclosure

The present disclosure relates to a detachable headphone module, and in particular it relates to a detachable headphone module that can be installed on augmented reality glasses.

Description of the Related Art

With the development of science and technology, many electronic devices (such as augmented reality glasses) are common and popular products.

Due to some advanced needs, for example, users can use augmented reality glasses to listen to music, watch videos, and so on, so that a smaller speaker is installed inside the glasses frame of augmented reality glasses to emit sound into the user's ears. However, the speaker built into the glasses frame is too small in size and does not have enough sound cavity, so that the sound effect output by this kind of speaker may be very poor.

Therefore, how to design an expansion module that can effectively improve the sound output of a speaker in augmented reality glasses is a topic that needs to be discussed.

BRIEF SUMMARY OF THE INVENTION

Accordingly, one objective of the present disclosure is to provide a detachable headphone module to solve the above problems.

The present disclosure provides a detachable headphone module that includes an engaging member and a sound output assembly. The engaging member is configured to engage with the temple of augmented reality glasses, and the engaging member has a sound input channel which is aligned with a first sound output opening of the temple. The sound output assembly is configured to be connected to the engaging member and has a communication channel, a front chamber and a second sound output opening. The communication channel is communicated with the sound input channel. The front chamber is communicated with the communication channel. The second sound output opening is configured to communicate with the front chamber. The sound output assembly extends from the engaging member in a first direction, the temple extends in a second direction, and the included angle formed between the first direction and the second direction is between 0 and 90 degrees.

According to some embodiments, the sound output assembly has a bottom cover and an upper cover, and the upper cover fixedly covers the bottom cover to form the communication channel.

According to some embodiments, the bottom cover is formed with a plurality of staggered separating plates which are disposed in the communication channel to form a loop path.

According to some embodiments, the detachable headphone module further includes a tuning element which is disposed on the engaging member and blocks a first opening of the sound input channel.

According to some embodiments, the engaging member is made of elastic material and has a first hook portion and a second hook portion, configured to engage with the temple on opposite sides of the temple, and when the engaging member is engaged with the temple, an inner wall surface of the second hook portion is attached to the temple to close the first opening of the sound input channel.

According to some embodiments, the detachable headphone module further includes a first soundproofing element which is disposed on the engaging member and surrounds the tuning element and the first opening, and when the engaging member is engaged with the temple, the first soundproofing element is located between the engaging member and the temple.

According to some embodiments, the engaging member is made of elastic material and has a first hook portion and a second hook portion, the first hook portion is rotatably connected to the second hook portion, and the first hook portion and the second hook portion are configured to be located on opposite sides of the temple to lock the temple.

According to some embodiments, the engaging member further has a movable section which is protruded from the second hook portion along a first axis toward the sound output assembly, wherein the bottom cover further has an accommodating section which is communicated with the communication channel, and the accommodating section is configured to accommodate the movable section so that the movable section moves along the first axis.

According to some embodiments, the accommodating section has a blocking structure configured to block a protruding structure of the movable section, and when viewed along the first axis, the blocking structure overlaps the protruding structure, wherein the detachable headphone module further includes a second soundproofing element which is disposed on the blocking structure.

According to some embodiments, a plurality of positioning bumps are formed on an inner wall surface of the accommodating section and extend along a second axis, and the protruding structure has a positioning groove which is selectively engaged with one of the positioning bumps so that the engaging member is positioned in different positions relative to the sound output assembly, where the second axis is perpendicular to the first axis.

The present disclosure provides augmented reality glasses which include a glasses frame, a detachable headphone module, a first blocking member and a second blocking member. The glasses frame has a speaker and at least one temple, and a first sound output opening is formed on the at least one temple and is connected to the speaker. The detachable headphone module is detachably installed on the at least one temple and includes an engaging member and a sound output assembly. The engaging member is configured to be engaged with the temple, and the engaging member has a sound input channel which is aligned with a first sound output opening. The sound output assembly is configured to be connected to the engaging member and has a communication channel, a front chamber and a second sound output opening. The communication channel is communicated with the sound input channel. The front chamber is communicated with the communication channel. The second sound output opening is configured to be communicated with the front chamber. The first blocking member and the second blocking member are detachably installed on the at least one temple, and the detachable headphone module is located between the first blocking member and the second blocking member.

The present disclosure provides a detachable headphone module, which is detachably installed on augmented reality glasses and may include an engaging member and a sound output assembly. The sound output assembly is connected to the engaging member, and the engaging member is engaged with the temple of the augmented reality glasses, so that the sound input channel of the engaging member is aligned with the first sound output opening located at the bottom of the temple, so that the sound enters the sound input channel and then output to the user through the sound output assembly. Based on the configuration of the detachable headphone module, the sound output effect of augmented reality glasses can be greatly improved whether in the low frequency or high frequency range.

In some embodiments, the detachable headphone module may further include a tuning element which is disposed on the engaging member and blocks the first opening of the sound input channel, thereby increasing the bass output effect of the detachable headphone module. In addition, the detachable headphone module may further include a first soundproofing element which is disposed on the engaging member and surrounds the tuning element and the first opening. Based on the configuration of the first soundproofing element, it can be ensured that the sound emitted from the first sound output opening can completely enter the first opening without leaking from a gap between the engaging member and the temple. Therefore, sound leakage can be avoided, so that the overall output volume is greatly improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
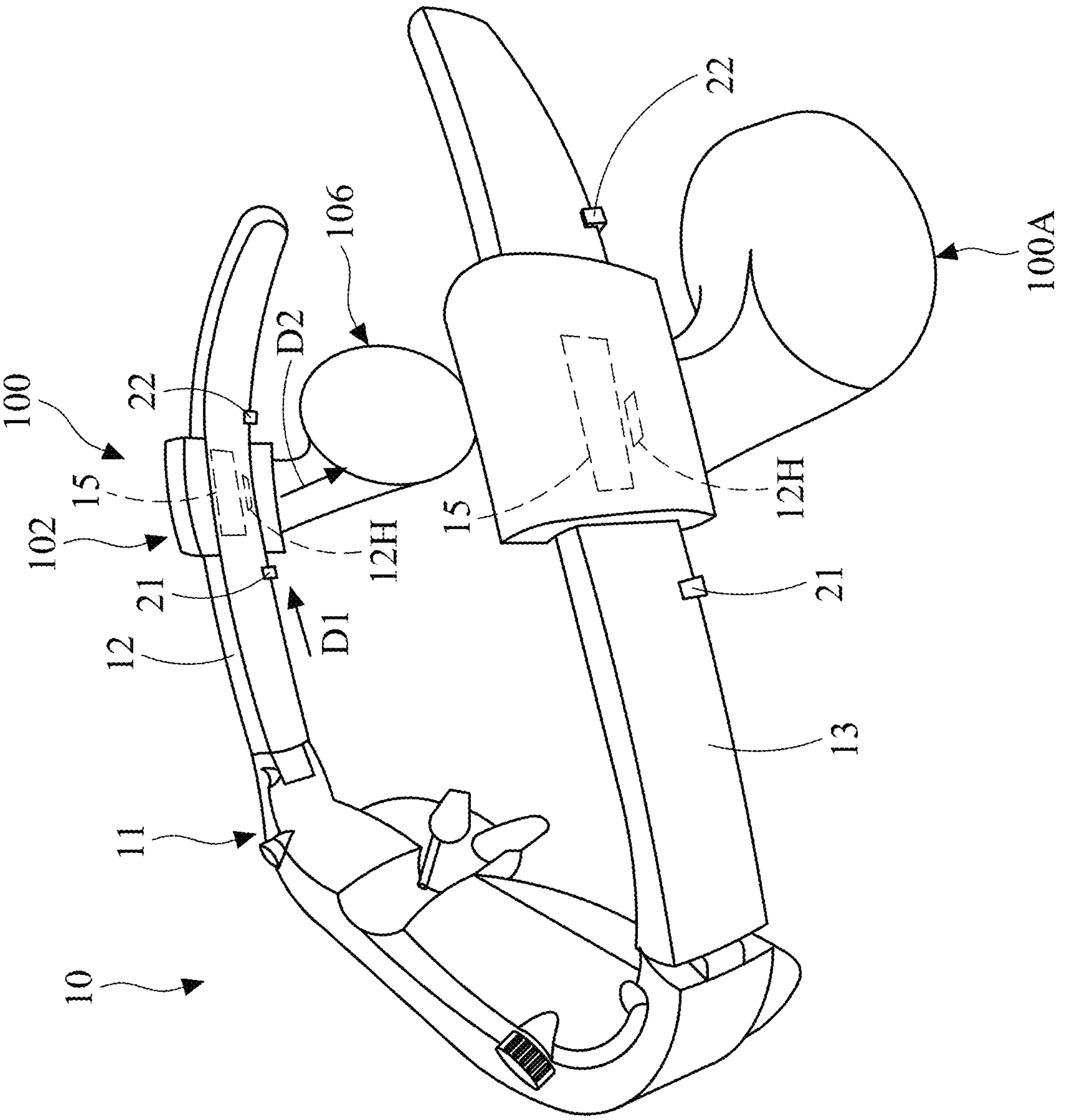
FIG. 1 is a perspective diagram of augmented reality glasses 10 and detachable headphone modules according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as “connected” and “interconnected”, refer to a relationship wherein structures are secured or attached to one another either directly or indirectly through intervening structures, as well as both movable or rigid attachments or relationships, unless expressly described otherwise.

Figure 2:
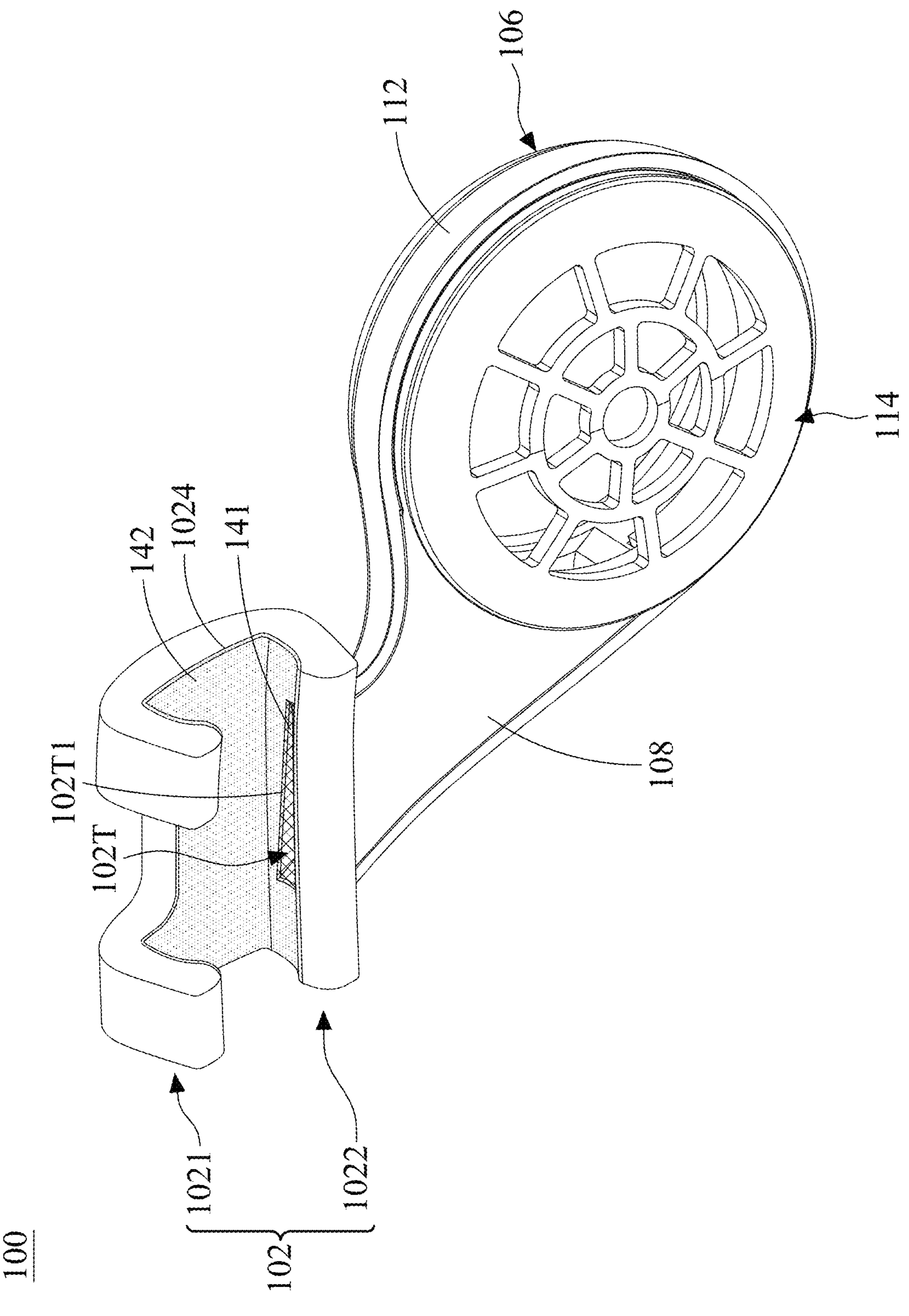
FIG. 2 is a three-dimensional diagram of a detachable headphone module 100 according to an embodiment of the present disclosure.
Figure 3:
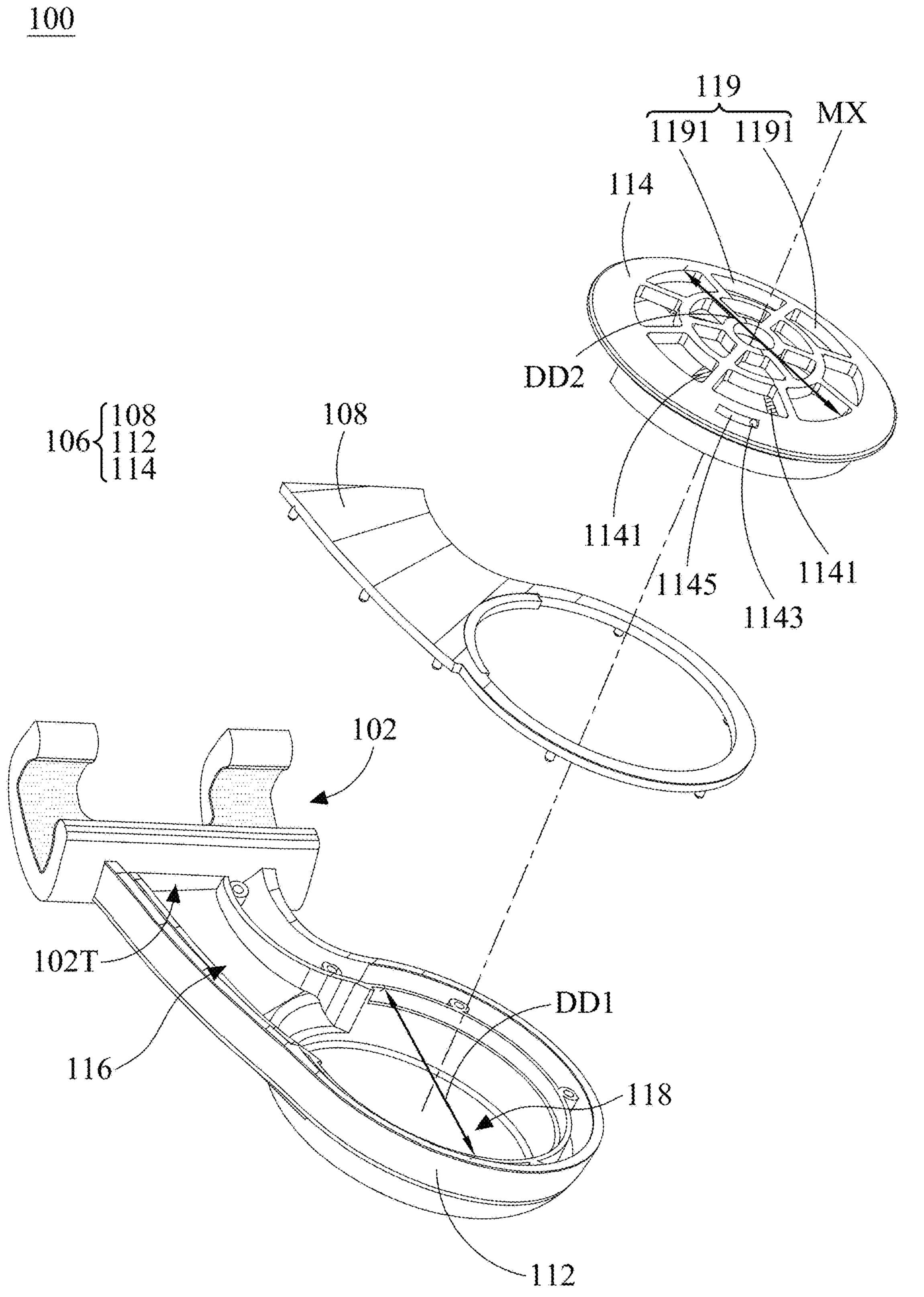
FIG. 3 is an exploded diagram of the detachable headphone module 100 according to an embodiment of the present disclosure.

Please refer to FIG. 1 to FIG. 3. FIG. 1 is a perspective diagram of augmented reality glasses 10 and detachable headphone modules according to an embodiment of the present disclosure. FIG. 2 is a three-dimensional diagram of a detachable headphone module 100 according to an embodiment of the present disclosure, and FIG. 3 is an exploded diagram of the detachable headphone module 100 according to an embodiment of the present disclosure. In this embodiment, the augmented reality glasses 10 may include a glasses frame 11, two temples 12, 13, two speakers 15, and two detachable headphone modules 100, 100A.

As shown in FIG. 1, the two temples 12 and 13 are connected to both sides of the glasses frame 11, and the two speakers 15 can be respectively installed in the two temples 12 and 13. A first sound output opening 12H is formed on each of the temples 12 and 13 (for example, at the bottom), and first sound output opening 12H is connected to the speaker 15, so that the sound emitted from the speaker 15 can be transmitted to the outside of the temple 12 and 13 through the first sound output opening 12H.

Furthermore, the detachable headphone modules 100 and 100A are detachably installed on the temples 12 and 13 respectively, and when the user wears the augmented reality glasses 10, the detachable headphone modules 100 and 100A are configured to transmit the sound emitted by the speaker 15 to the user's ears.

The number and location of speakers 15 are not limited to this embodiment. For example, the augmented reality glasses 10 may only include one speaker 15, which is disposed in the glasses frame 11 and connected to the first sound output opening 12H and the detachable headphone modules 100, 100A through a sound guide channel (not shown in the figures) in the glasses frame 11 and the temples 12, 13.

In addition, the augmented reality glasses 10 may further include two first blocking members 21 and two second blocking members 22. The first blocking members 21 and the second blocking members 22 are detachably installed on the temples 12 and 13, and the detachable headphone module 100 or 100A is located between the corresponding first blocking member 21 and the second blocking member 22.

The first blocking member 21 and the second blocking member 22 can limit the position of the detachable headphone module 100 and 100A on the temples 12 and 13 to prevent the detachable headphone module 100 and 100A from sliding and affecting the user's experience. The first blocking member 21 and the second blocking member 22 can be made of elastic material, such as rubber material, and can have a U-shaped structure to be smoothly engaged with the temples 12 and 13.

Because the detachable headphone module 100 and 100A are symmetrically, the following paragraphs only describes the specific structure of the detachable headphone module 100. In this embodiment, as shown in FIG. 2, the detachable headphone module 100 may include an engaging member 102 and a sound output assembly 106.

The engaging member 102 is configured to be engaged with the temple 12, and the engaging member 102 has a sound input channel 102T which is aligned with the first sound output opening 12H of the temple 12. The sound output assembly 106 is configured to be connected to the engaging member 102, and the engaging member 102 and the sound output assembly 106 may be integrally formed as one piece, but they are not limited thereto. In other embodiments, they may be separable parts and can be assembled.

As shown in FIG. 3, the sound output assembly 106 may have an upper cover 108, a bottom cover 112 and an outer cover 114. The upper cover 108 fixedly covers the bottom cover 112 along a main axis MX to form a communication channel 116. The outer cover 114 is fixedly connected to the bottom cover 112 along the main axis MX to form a front chamber 118 with the bottom cover 112 and the upper cover 108. The communication channel 116 is communicated with the sound input channel 102T, and the communication channel 116 is communicated with the front chamber 118.

Furthermore, a second sound output opening 119 is formed on the outer cover 114 and is configured to communicate with the front chamber 118. The second sound output opening 119 may be composed of multiple sub-openings 1191, and these sub-openings 1191 are formed on the outer cover 114 in a radial shape. It is worth noting that when viewed along the main axis MX, the area of the second sound output opening 119 is 20% to 80% of the overall area of the outer cover 114.

For example, when the area of the second sound output opening 119 is 20% of the overall area of the outer cover 114, the detachable headphone module 100 can achieve the best bass output effect. As shown in FIG. 3, one or more blocking plates 1141 can be disposed in the outer cover 114 and are connected to an adjusting rod 1143. The adjusting rod 1143 can move along a groove 1145 to drive these blocking plates 1141 to rotate to shield a portion of the sub-openings 1191, so as to adjust the area ratio of the second sound output opening 119 and the outer cover 114 to achieve different sound output effects.

Furthermore, as shown in FIG. 3, the front chamber 118 has a first inner diameter DD1, and the second sound output opening 119 has a second inner diameter DD2. The first inner diameter DD1 can be greater than the second inner diameter DD2, and such a configuration can increase the sound output effect of the detachable headphone module 100 in high frequencies.

In addition, it is worth noting that, as shown in FIG. 1, the sound output assembly 106 extends in a first direction D1 from the engaging member 102, the temple 12 extends in a second direction D2, and the included angle formed between the first direction D1 and the second direction D2 is between 0 and 90 degrees. Based on such a design, the augmented reality glasses 10 and the detachable headphone module 100 can be made more ergonomic to increase the user's comfort when wearing the augmented reality glasses 10.

In this embodiment, as shown in FIG. 2, the detachable headphone module 100 may further include a tuning element 141 which is disposed on the engaging member 102 and shields a first opening 102T1 of the sound input channels 102T. The tuning element 141 is, for example, foam or sponge with holes, but it is not limited thereto. Based on this configuration, the bass output effect of the detachable headphone module 100 can be increased.

It is also worth noting that the size of the first opening 102T1 is greater than the size of the first sound output opening 12H. For example, the size of first opening 102T1 may be more than twice the size of first sound output opening 12H. Based on this configuration, it can be ensured that the first sound output opening 12H is completely located within the range of the first opening 102T1, without the problem of sound leakage.

Figure 4:
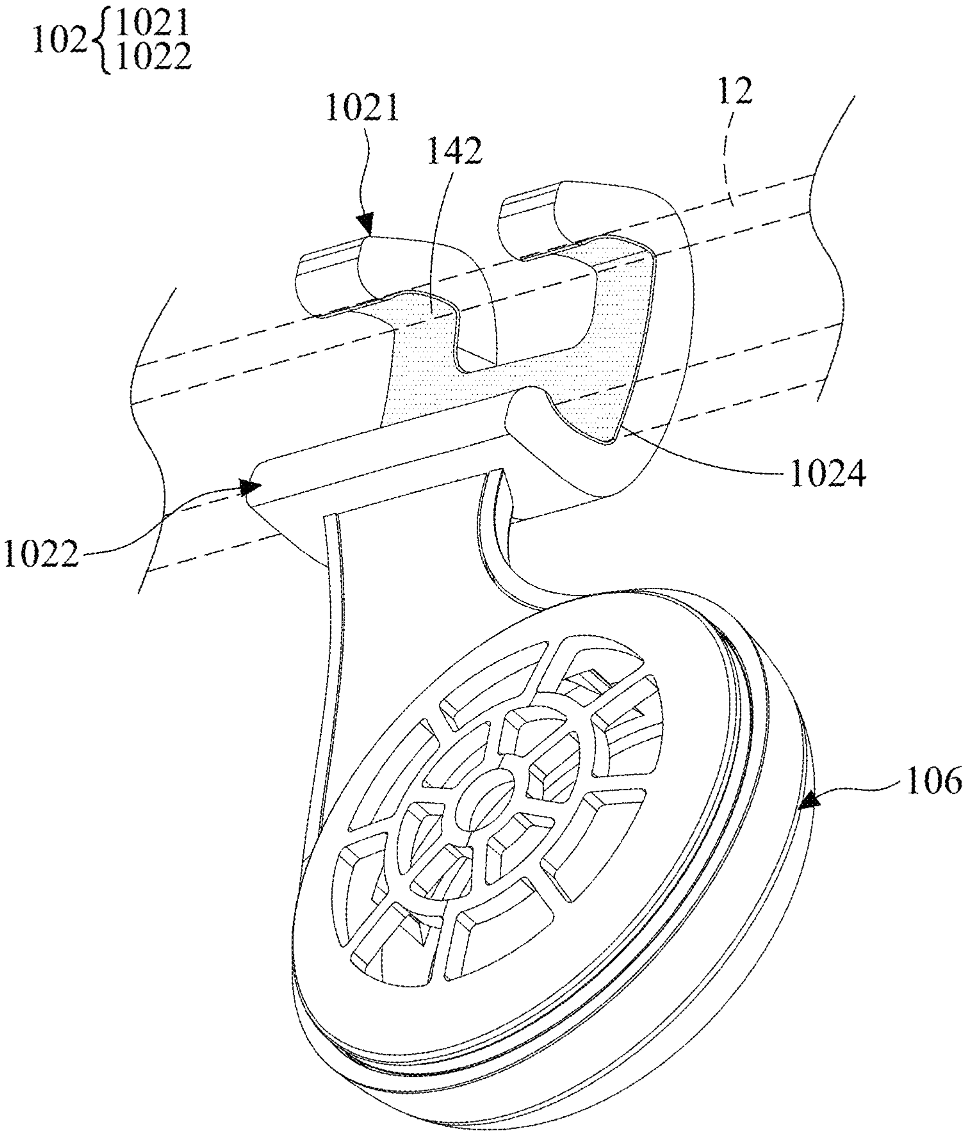
FIG. 4 is a perspective diagram of the detachable headphone module 100 in another view according to an embodiment of the present disclosure.

Next, please refer to FIG. 2 and FIG. 4. FIG. 4 is a perspective diagram of the detachable headphone module

100 in another view according to an embodiment of the present disclosure. In this embodiment, the detachable headphone module 100 may further include a first soundproofing element 142 which is disposed on the engaging member 102 and surrounds the tuning element 141 and the first opening 102T1. Furthermore, the engaging member 102 may have a first hook portion 1021 and a second hook portion 1022, and the first soundproofing element 142 is disposed on an inner wall surface 1024 of the first hook portion 1021 and the second hook portion 1022.

The first soundproofing element 142 and the tuning element 141 can be made of different materials. For example, the tuning element 141 can be made of polyurethane (PU) foam, polyethylene (PE) foam, glass fiber wool, rock wool, polyester fiber, wood wool, mineral wool and so on, and the first soundproofing element 142 may be made of rubber, resin, calcium silicate board, gypsum board, polyvinyl chloride resin (PVC), polymer rubber, and so on, but they are not limited thereto. Furthermore, the density of the first soundproofing element 142 may be greater than the density of the tuning element 141, but they are not limited thereto.

In addition, the first soundproofing element 142 may have an elastic material, for example. Therefore, when the engaging member 102 is engaged with the temple 12, the first soundproofing element 142 is located between the engaging member 102 and the temple 12 and completely closes peripheral of the first opening 102T1.

Based on the configuration of the first soundproofing element 142, it can be ensured that the sound emitted from the first sound output opening 12H can completely enter the first opening 102T1 without leaking from a gap between the engaging member 102 and the temple 12. That is, the first soundproofing element 142 can completely fill the gap between the engaging member 102 and the temple 12.

In addition, in other embodiments, the configuration of the first soundproofing element 142 can also be omitted, and the engaging member 102 is made of elastic material, such as elastic rubber material. Due to the inward elastic force, the first hook portion 1021 and the second hook portion 1022 can reliably engage with the temple 12 on opposite sides of the temple 12. Furthermore, when the engaging member 102 is engaged with the temple 12, the inner wall surface 1024 of the first hook portion 1021 and the second hook portion 1022 can be completely attached to the temple 12 to close the first opening 102T1 of the sound input channel 102T.

Based on this configuration, similarly, the sound emitted from the first sound output opening 12H can completely enter the first opening 102T1 without leaking from the gap between the engaging member 102 and the temple 12.

Figure 5:
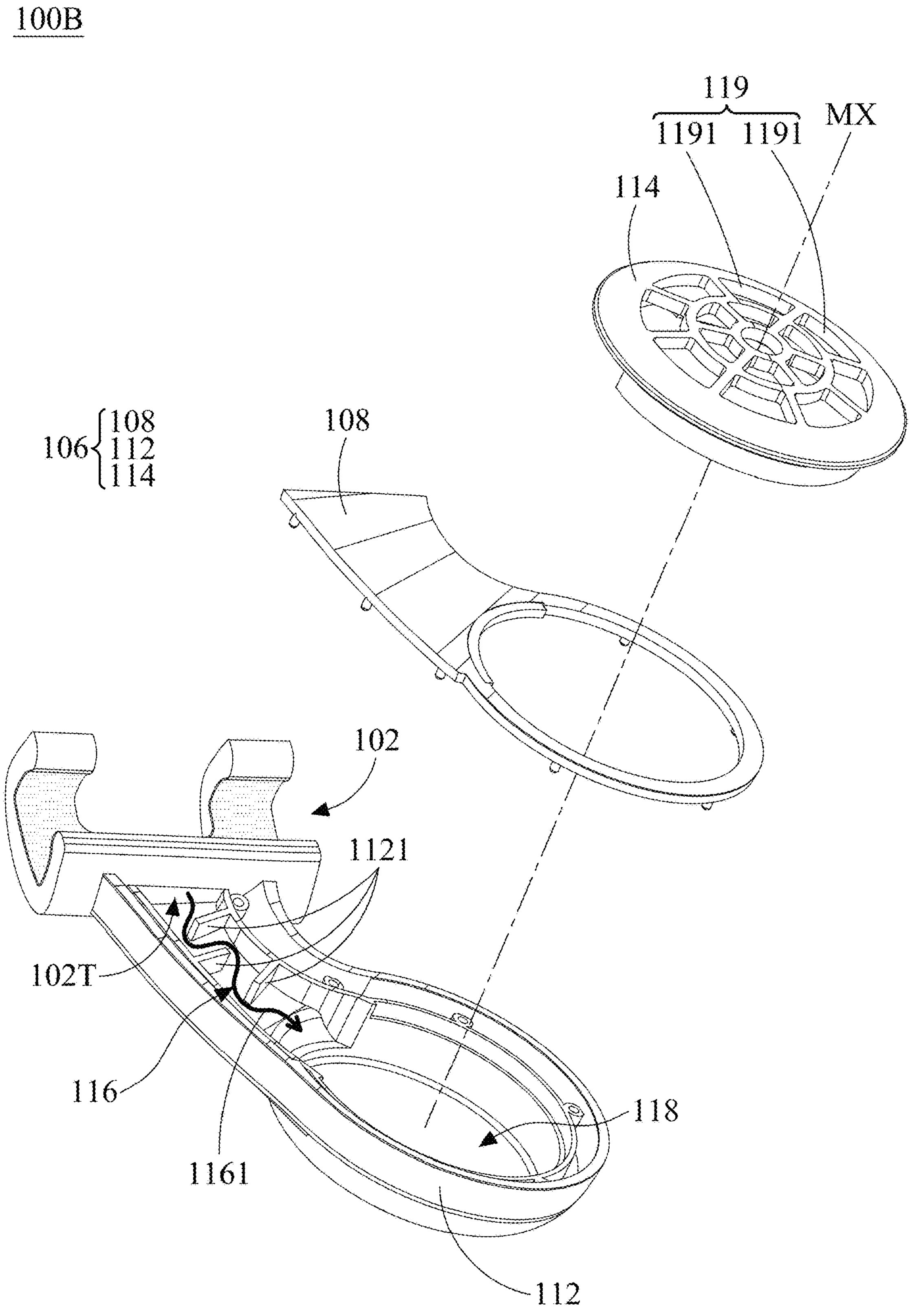
FIG. 5 is an exploded diagram of a detachable headphone module 100B according to another embodiment of the present disclosure.

Next, please refer to FIG. 5. FIG. 5 is an exploded diagram of a detachable headphone module 100B according to another embodiment of the present disclosure. The structure of the detachable headphone module 100B is similar to the structure of the detachable headphone module 100 of the previous embodiment. The upper cover 108 of this embodiment also fixedly covers the bottom cover 112 to form the communication channel 116. It is worth noting that the bottom cover 112 of this embodiment can be further formed with a plurality of staggered separating plates 1121 which are disposed in the communication channel 116 so as to form a loop path 1161.

Based on such a structural configuration, the path length of sound traveling within the communication channel 116 can be increased, thereby increasing the overall bass output effect. As shown in FIG. 5, in this embodiment, the bottom cover 112 is formed with three separating plates 1121, but the number of the separating plates is not limited thereto. That is, any configuration that can form a meandering loop path 1161 is within the scope of the present disclosure.

Figure 6:
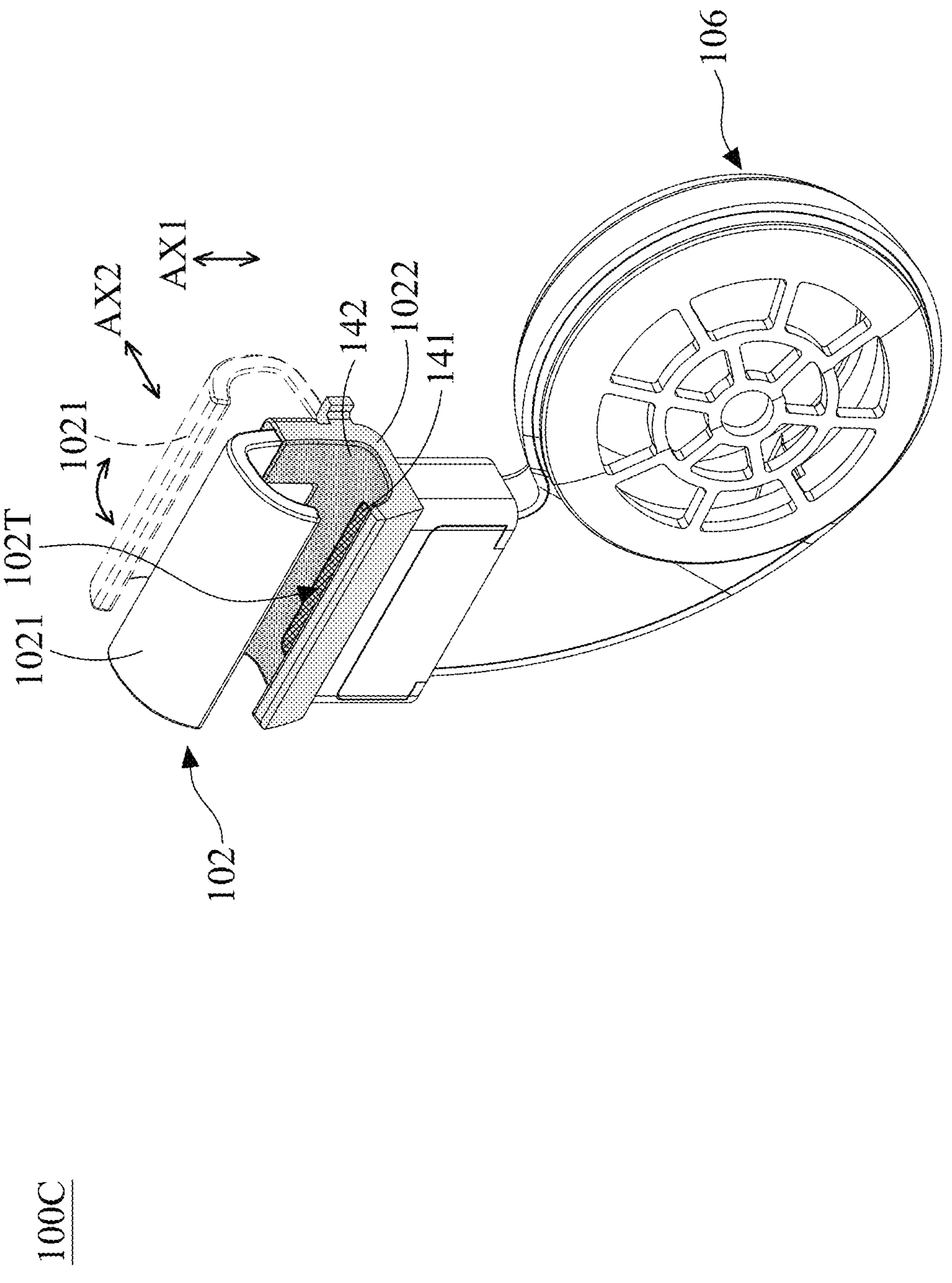
FIG. 6 is a perspective diagram of a detachable headphone module 100C according to another embodiment of the present disclosure.
Figure 7:
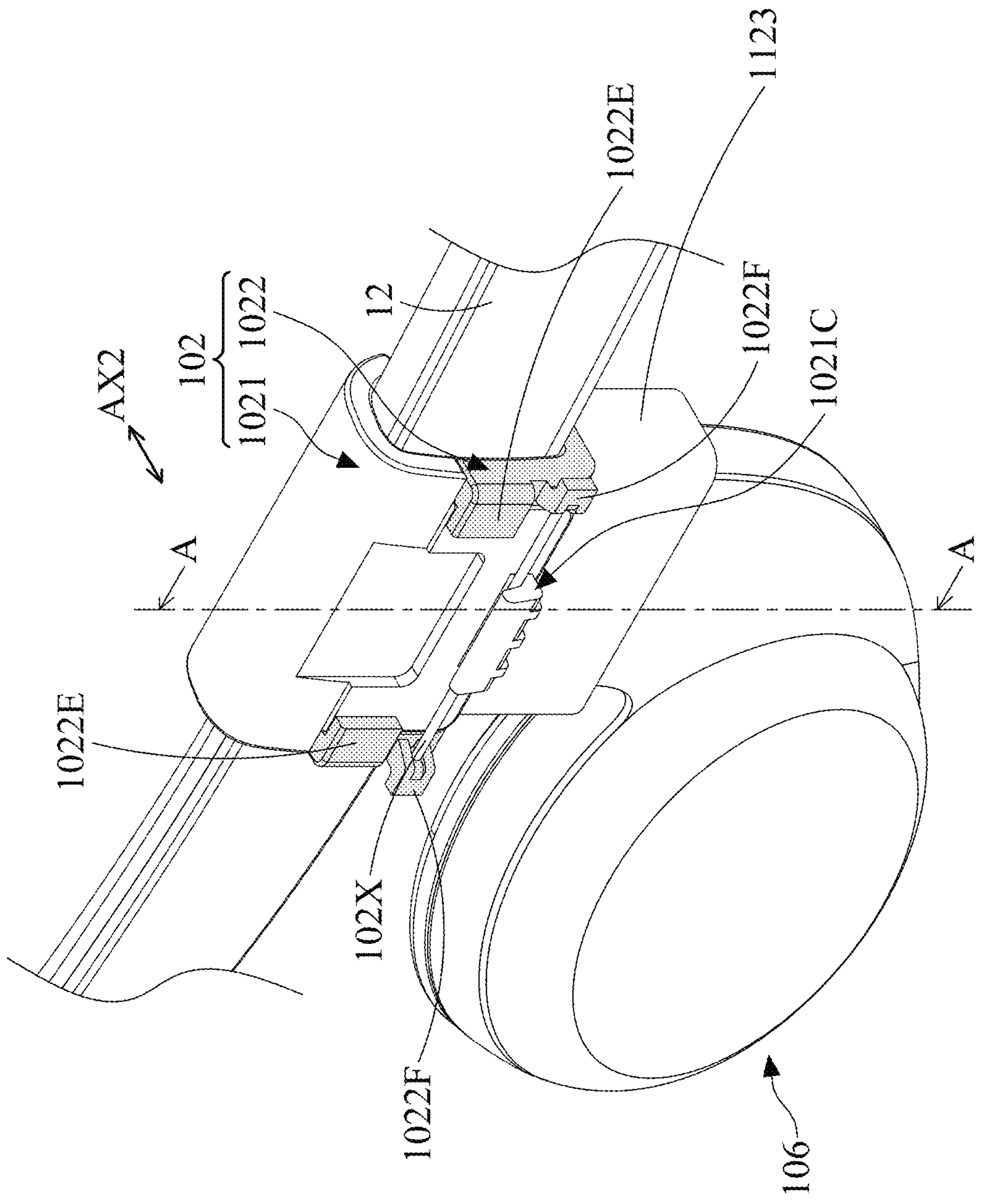
FIG. 7 is a perspective diagram of the detachable headphone module 100C in another view according to another embodiment of the present disclosure.
Figure 8:
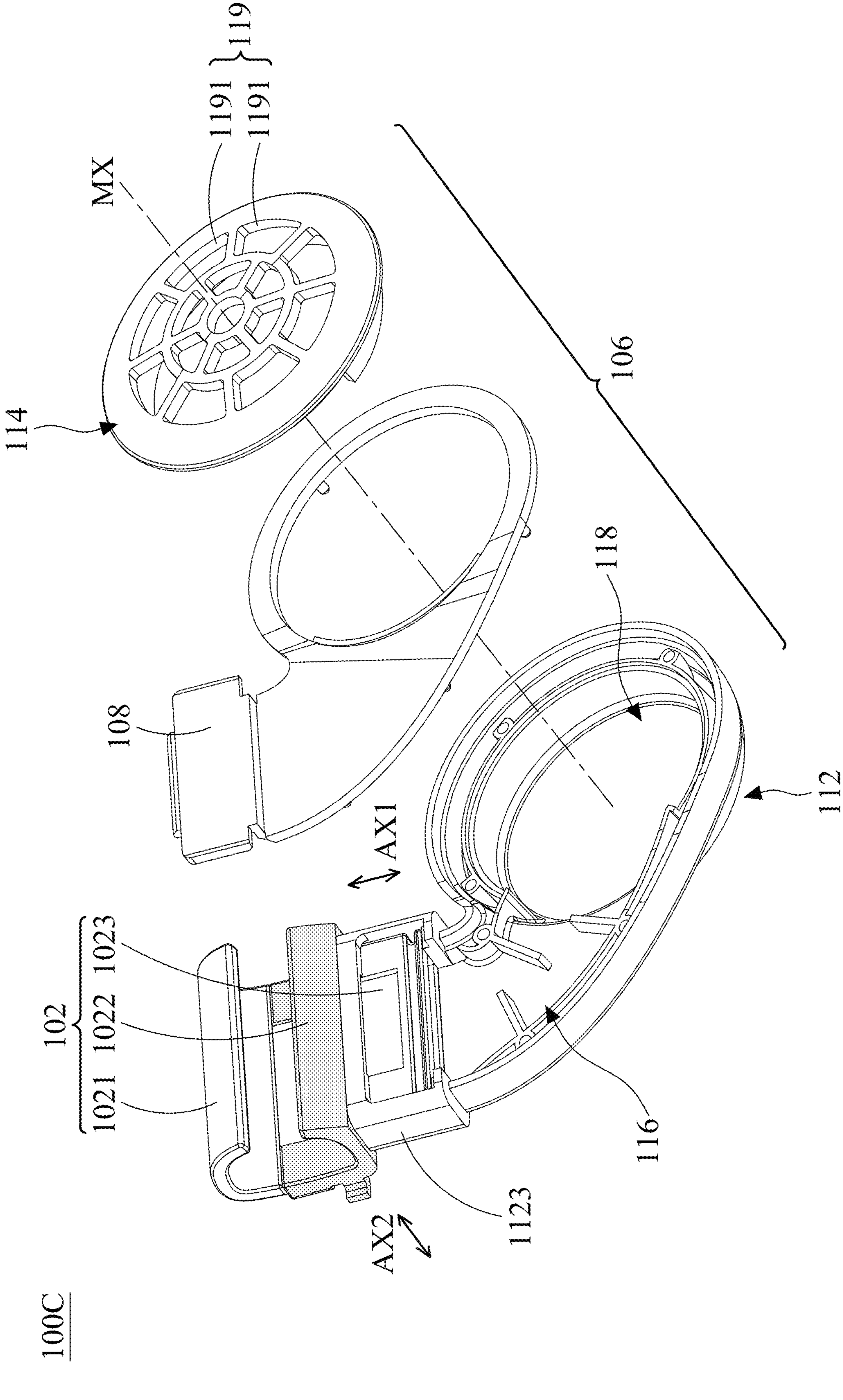
FIG. 8 is an exploded diagram of the detachable headphone module 100C according to another embodiment of the present disclosure.

Next, please refer to FIG. 6 to FIG. 8. FIG. 6 is a perspective diagram of a detachable headphone module 100C according to another embodiment of the present disclosure, FIG. 7 is a perspective diagram of the detachable headphone module 100C in another view according to another embodiment of the present disclosure, and FIG. 8 is an exploded diagram of the detachable headphone module 100C according to another embodiment of the present disclosure. Similarly, the engaging member 102 is made of elastic material and has a first hook portion 1021 and a second hook portion 1022.

It is worth noting that the first hook portion 1021 and the second hook portion 1022 of this embodiment are detachable members, and the first hook portion 1021 is rotatably connected to the second hook portion 1022. For example, as shown in FIG. 7, the engaging member 102 may further include a rotating shaft member 102X which is fixed on two fixed structures 1022F of the second hook portion 1022 and passes through a receiving structure 1021C of the first hook portion 1021.

Furthermore, the second hook portion 1022 may further have two elastic flexible structures 1022E configured to block a portion of the first hook portion 1021. When the user applies a force (an outward force) along a second axis AX2, the first hook portion 1021 can push the elastic flexible structures 1022E to be spread. Then, the first hook portion 1021 can rotate around the rotating shaft member 102X, for example, to a release position (indicated by a dotted line) in FIG. 6.

On the contrary, when it is desired that the detachable headphone module 100C be installed on the temple 12, the user can first engage the second hook portion 1022 with the temple 12, and then apply a force along the second axis AX2 (an inward force), so that the first hook portion 1021 can rotate around the rotating shaft member 102X and push the elastic flexible structures 1022E to squeeze in the two elastic flexible structures 1022E.

Therefore, as shown in FIG. 7, the first hook portion 1021 and the second hook portion 1022 can be located on opposite sides of the temple 12 to lock the temple 12. At this time, the first hook portion 1021 is in an engaging position relative to the second hook portion 1022.

Based on the above configuration, the user can more easily install the detachable headphone module 100C on the temple 12 or remove the detachable headphone module 100C from the temple 12, and the position of the detachable headphone module 100C can also be easily adjusted.

Next, as shown in FIG. 8, in this embodiment, the engaging member 102 can further have a movable section 1023 which is protruded from the second hook portion 1022 along a first axis AX1 toward the bottom cover 112 of the sound output assembly 106. Specifically, the bottom cover 112 may further have an accommodating section 1123 which is communicated with the communication channel 116, and the accommodating section 1123 is configured to accommodate the movable section 1023, so that the movable section 1023 can move along the first axis AX1 within the accommodating section 1123.

Figure 9:
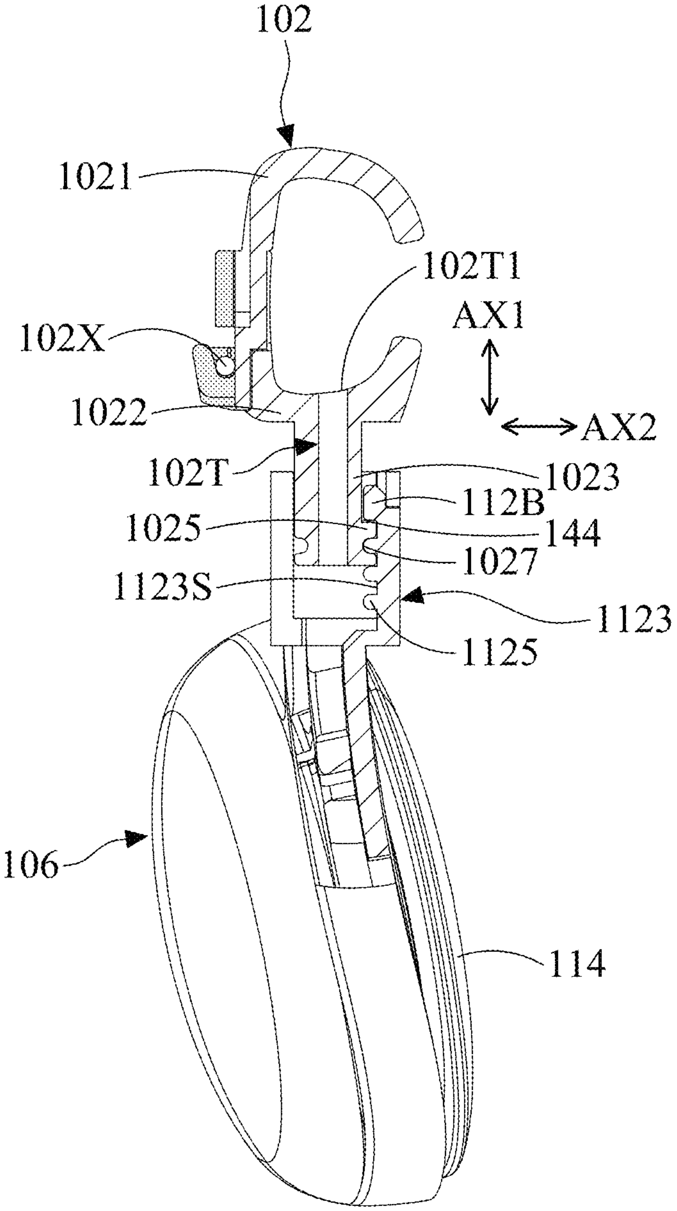
FIG. 9 is a cross-sectional view of the detachable headphone module 100C along line A-A in FIG. 7 according to another embodiment of the present disclosure.

Then, please refer to FIG. 6 to FIG. 9. FIG. 9 is a cross-sectional view of the detachable headphone module 100C along line A-A in FIG. 7 according to another embodiment of the present disclosure. As shown in FIG. 9, the accommodating section 1123 may have a blocking structure 112B configured to block a protruding structure 1025 of the movable section 1023. Based on such a configuration, the movable section 1023 can be prevented from being separated from the accommodating section 1123 when moving upward.

As shown in FIG. 9, when viewed along the first axis AX1, the blocking structure 112B overlaps the protruding structure 1025, and the detachable headphone module 100C may further include a second soundproofing element 144 which is disposed on the bottom of the blocking structure 112B. The material of the second soundproofing element 144 can be the same as the material of the first soundproofing element 142. Based on the configuration of the second soundproofing element 144, it can be ensured that sound does not leak out through the gap between the movable section 1023 and the accommodating section 1123.

Furthermore, in this embodiment, a plurality of positioning bumps 1125 can be formed on the inner wall surface 1123S of the accommodating section 1123, which extend along the second axis AX2, and the elastic protruding structure 1025 can correspondingly have a positioning groove 1027 which is selectively engaged with one of the positioning bumps 1125 so that the engaging member 102 can be positioned in different positions relative to the sound output assembly 106. The second axis AX2 is perpendicular to the first axis AX1.

Based on the above structural configuration, the length of the detachable headphone module 100C is adjustable, so that it can be suitable for different users to achieve the best wearing experience. In addition, when the length of the detachable headphone module 100C is extended (for example, as shown in FIG. 9), the total path length of the sound traveling within the detachable headphone module 100C can also be increased, thereby more effectively increasing the bass output effect.

Figure 10:
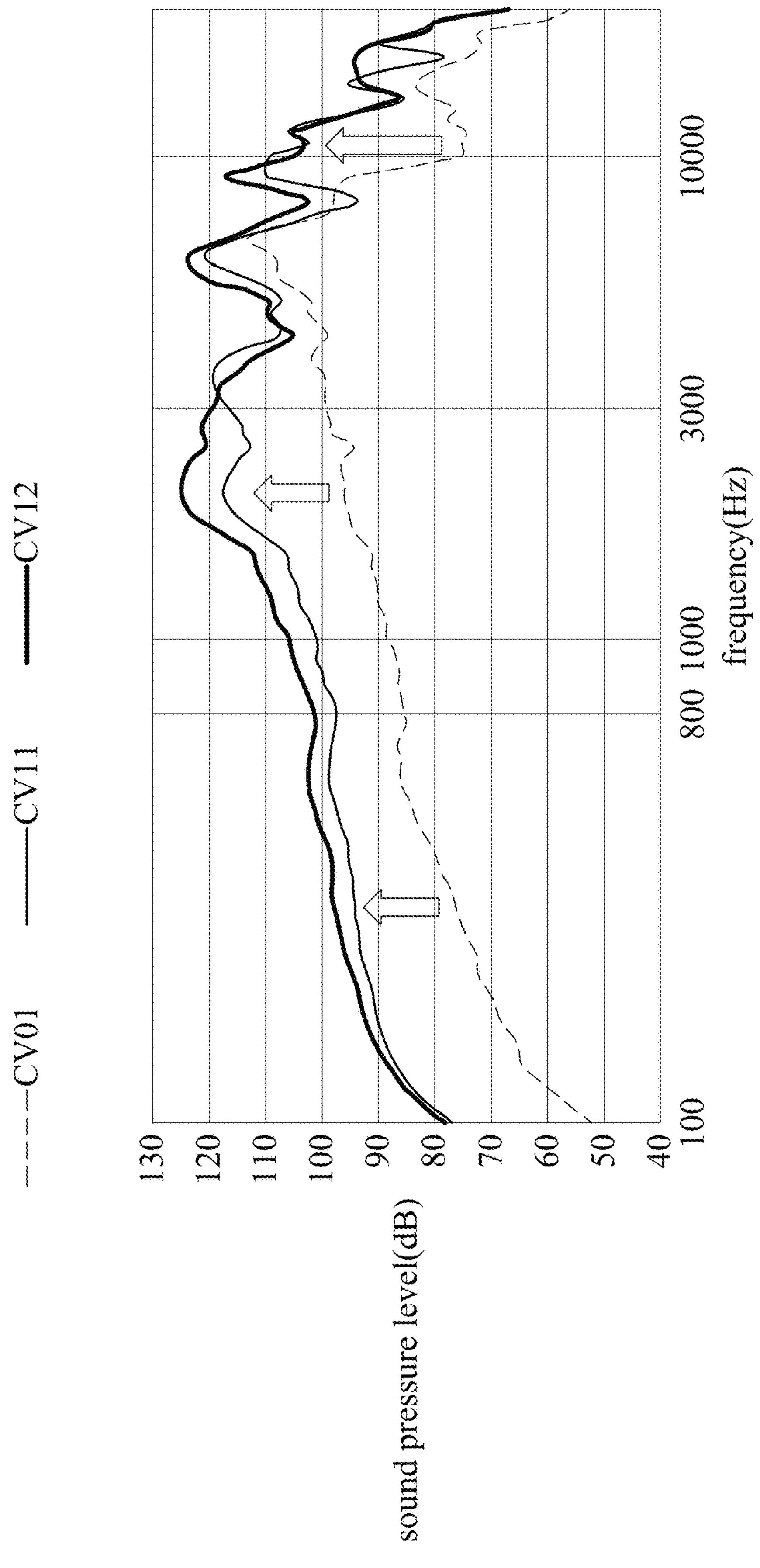
FIG. 10 is a diagram showing the relationship between frequency and sound pressure level of the sound output of conventional augmented reality glasses and the augmented reality glasses 10 according to an embodiment of the present disclosure.
Figure 11:
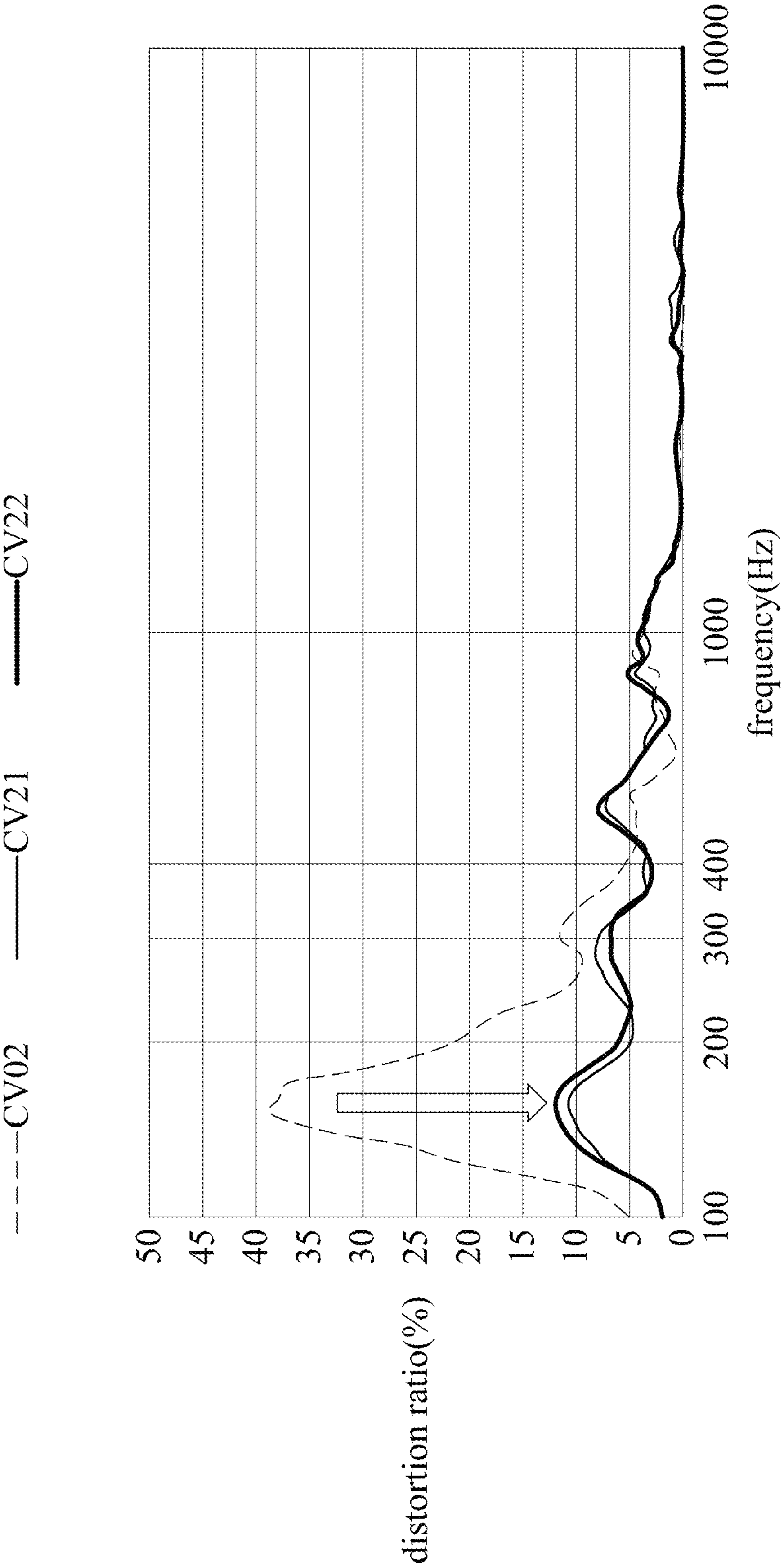
FIG. 11 is a diagram showing the relationship between frequency and distortion ratio of the sound output of the conventional augmented reality glasses and the augmented reality glasses 10 according to an embodiment of the present disclosure.

Next, please refer to FIG. 10 and FIG. 11. FIG. 10 is a diagram showing the relationship between frequency and sound pressure level of the sound output of conventional augmented reality glasses and the augmented reality glasses 10 according to an embodiment of the present disclosure, and FIG. 11 is a diagram showing the relationship between frequency and distortion ratio of the sound output of the conventional augmented reality glasses and the augmented reality glasses 10 according to an embodiment of the present disclosure.

The curve CV01 represents the sound pressure level curve of the conventional augmented reality glasses (without the detachable headphone module of the present disclosure) at different frequencies, the curve CV11 represents the sound pressure level curve of the augmented reality glasses 10 with the detachable headphone module 100 of the present disclosure at different frequencies, and the curve CV12 represents the sound pressure level curve of the augmented reality glasses 10 with the detachable headphone module 100B of the present disclosure at different frequencies.

As shown in FIG. 10, when the frequency is below 3000 Hz or in the low frequency range (below 800 Hz), compared to the conventional augmented reality glasses, the sound pressure level of the augmented reality glasses 10 with the detachable headphone module 100 or 100B is significantly improved. Similarly, in the high frequency range (for example, 10000 Hz), the sound pressure level of the augmented reality glasses 10 of the present disclosure is also significantly improved.

In FIG. 11, the curve CV02 represents the distortion ratio of the conventional augmented reality glasses at different frequencies, the curve CV21 represents the distortion ratio of the augmented reality glasses 10 with the detachable headphone module 100 of the present disclosure at different frequencies, and the curve CV22 represents the distortion ratio of the augmented reality glasses 10 with the detachable headphone module 100B of the present disclosure at different frequencies.

As shown in FIG. 11, compared to the conventional augmented reality glasses, the distortion ratio of the augmented reality glasses 10 with the detachable headphone module 100 or 100B is significantly reduced when the frequency is below 400 Hz, so that it can provide users with better bass output effect.

In summary, the present disclosure provides a detachable headphone module, which is detachably installed on augmented reality glasses 10 and may include an engaging member 102 and a sound output assembly 106. The sound output assembly 106 is connected to the engaging member 102, and the engaging member 102 is engaged with the temple of the augmented reality glasses 10, so that the sound input channel 102T of the engaging member 102 is aligned with the first sound output opening 12H located at the bottom of the temple, so that the sound enters the sound input channel 102T and then output to the user through the sound output assembly 106. Based on the configuration of the detachable headphone module, the sound output effect of augmented reality glasses 10 can be greatly improved whether in the low frequency or high frequency range.

In some embodiments, the detachable headphone module may further include a tuning element 141 which is disposed on the engaging member 102 and blocks the first opening 102T1 of the sound input channel 102T, thereby increasing the bass output effect of the detachable headphone module. In addition, the detachable headphone module may further include a first soundproofing element 142 which is disposed on the engaging member 102 and surrounds the tuning element 141 and the first opening 102T1. Based on the configuration of the first soundproofing element 142, it can be ensured that the sound emitted from the first sound output opening 12H can completely enter the first opening 102T1 without leaking from a gap between the engaging member 102 and the temple 12. Therefore, sound leakage can be avoided, so that the overall output volume is greatly improved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A detachable headphone module, comprising:

an engaging member, configured to be engaged with a temple of augmented reality glasses, wherein the engaging member has a sound input channel which is aligned with a first sound output opening of the temple; and a sound output assembly, configured to be connected to the engaging member, wherein the sound output assembly includes:

a communication channel, communicated with the sound input channel;

a front chamber, communicated with the communication channel; and a second sound output opening, configured to be communicated with the front chamber;

wherein the sound output assembly extends from the engaging member in a first direction, the temple extends in a second direction, and an included angle formed between the first direction and the second direction is between 0 and 90 degrees;

wherein the sound output assembly has a bottom cover and an upper cover, and the upper cover fixedly covers the bottom cover to form the communication channel.

2. The detachable headphone module as claimed in claim 1, wherein the bottom cover is formed with a plurality of staggered separating plates which are disposed in the communication channel to form a loop path.

3. The detachable headphone module as claimed in claim 2, wherein the detachable headphone module further includes a tuning element which is disposed on the engaging member and blocks a first opening of the sound input channel.

4. The detachable headphone module as claimed in claim 3, wherein the engaging member is made of elastic material and has a first hook portion and a second hook portion, configured to engage with the temple on opposite sides of the temple, and when the engaging member is engaged with the temple, an inner wall surface of the second hook portion is attached to the temple to close the first opening of the sound input channel.

5. The detachable headphone module as claimed in claim 3, wherein the detachable headphone module further includes a first soundproofing element which is disposed on the engaging member and surrounds the tuning element and the first opening, and when the engaging member is engaged with the temple, the first soundproofing element is located between the engaging member and the temple.

6. The detachable headphone module as claimed in claim 5, wherein the engaging member is made of elastic material and has a first hook portion and a second hook portion, the first hook portion is rotatably connected to the second hook portion, and the first hook portion and the second hook portion are configured to be located on opposite sides of the temple to lock the temple.

7. The detachable headphone module as claimed in claim 6, wherein the engaging member further has a movable section which is protruded from the second hook portion along a first axis toward the sound output assembly, wherein the bottom cover further has an accommodating section which is communicated with the communication channel, and the accommodating section is configured to accommodate the movable section so that the movable section moves along the first axis.

8. The detachable headphone module as claimed in claim 7, wherein the accommodating section has a blocking structure configured to block a protruding structure of the movable section, and when viewed along the first axis, the blocking structure overlaps the protruding structure, wherein the detachable headphone module further includes a second soundproofing element which is disposed on the blocking structure.

9. The detachable headphone module as claimed in claim 8, wherein a plurality of positioning bumps are formed on an inner wall surface of the accommodating section and extend along a second axis, and the protruding structure has a positioning groove which is selectively engaged with one of the positioning bumps so that the engaging member is positioned in different positions relative to the sound output assembly, wherein the second axis is perpendicular to the first axis.

10. Augmented reality glasses with a detachable headphone module, comprising:

a glasses frame, having a speaker and at least one temple, wherein a first sound output opening is formed on the at least one temple and is connected to the speaker;

a detachable headphone module, detachably installed on the at least one temple, including:

an engaging member configured to be engaged with the temple, wherein the engaging member has a sound input channel which is aligned with a first sound output opening; and a sound output assembly, configured to be connected to the engaging member, wherein the sound output assembly includes:

a communication channel, communicated with the sound input channel;

a front chamber, communicated with the communication channel; and a second sound output opening, configured to be communicated with the front chamber;

a first blocking member; and a second blocking member;

wherein the first blocking member and the second blocking member are detachably installed on the at least one temple, and the detachable headphone module is located between the first blocking member and the second blocking member.

11. The augmented reality glasses as claimed in claim 10, wherein the sound output assembly has a bottom cover and an upper cover, and the upper cover fixedly covers the bottom cover to form the communication channel.

12. The augmented reality glasses as claimed in claim 11, wherein the bottom cover is formed with a plurality of staggered separating plates which are disposed in the communication channel to form a loop path.

13. The augmented reality glasses as claimed in claim 12, wherein the detachable headphone module further includes a tuning element which is disposed on the engaging member and blocks a first opening of the sound input channel.

14. The augmented reality glasses as claimed in claim 13, wherein the engaging member is made of elastic material and has a first hook portion and a second hook portion, configured to engage with the temple on opposite sides of the temple, and when the engaging member is engaged with the temple, an inner wall surface of the second hook portion is attached to the temple to close the first opening of the sound input channel.

15. The augmented reality glasses as claimed in claim 13, wherein the detachable headphone module further includes a first soundproofing element which is disposed on the engaging member and surrounds the tuning element and the first opening, and when the engaging member is engaged with the temple, the first soundproofing element is located between the engaging member and the temple.

16. The augmented reality glasses as claimed in claim 15, wherein the engaging member is made of elastic material and has a first hook portion and a second hook portion, the first hook portion is rotatably connected to the second hook portion, and the first hook portion and the second hook portion are configured to be located on opposite sides of the temple to lock the temple.

17. The augmented reality glasses as claimed in claim 16, wherein the engaging member further has a movable section which is protruded from the second hook portion along a first axis toward the sound output assembly, wherein the bottom cover further has an accommodating section which is communicated with the communication channel, and the accommodating section is configured to accommodate the movable section so that the movable section moves along the first axis.

18. The augmented reality glasses as claimed in claim 17, wherein the accommodating section has a blocking structure configured to block a protruding structure of the movable section, and when viewed along the first axis, the blocking structure overlaps the protruding structure, wherein the detachable headphone module further includes a second soundproofing element which is disposed on the blocking structure.

19. The augmented reality glasses as claimed in claim 18, wherein a plurality of positioning bumps are formed on an inner wall surface of the accommodating section and extend along a second axis, and the protruding structure has a positioning groove which is selectively engaged with one of the positioning bumps so that the engaging member is positioned in different positions relative to the sound output assembly, wherein the second axis is perpendicular to the first axis.

* * * * *